United States Patent
Song et al.

(10) Patent No.: US 10,776,786 B2
(45) Date of Patent: Sep. 15, 2020

(54) METHOD FOR CREATING, REGISTERING, REVOKING AUTHENTICATION INFORMATION AND SERVER USING THE SAME

(71) Applicant: Coinplug, Inc., Gyeonggi-do (KR)

(72) Inventors: Joo Han Song, Gyeonggi-do (KR); Jay Wu Hong, Seoul (KR); Joon Sun Uhr, Gyeonggi-do (KR)

(73) Assignee: Coinplug, Inc., Gyeonggi-do (KR)

( * ) Notice: Subject to any disclaimer, the term of this patent is extended or adjusted under 35 U.S.C. 154(b) by 561 days.

(21) Appl. No.: 15/488,821

(22) Filed: Apr. 17, 2017

(65) Prior Publication Data
US 2017/0316497 A1 Nov. 2, 2017

(30) Foreign Application Priority Data
Apr. 28, 2016 (KR) .................. 10-2016-0051936

(51) Int. Cl.
G06Q 20/40 (2012.01)
G06Q 40/02 (2012.01)
H04L 9/32 (2006.01)

(52) U.S. Cl.
CPC ......... *G06Q 20/4014* (2013.01); *G06Q 40/02* (2013.01); *H04L 9/3231* (2013.01);
(Continued)

(58) Field of Classification Search
CPC ............... G06Q 20/4014; G06Q 40/02; G06Q 2220/00; H04L 9/3268; H04L 9/3231;
(Continued)

(56) References Cited

U.S. PATENT DOCUMENTS 10,252,145 B2 * 4/2019 Tran .................. H04N 5/2257
10,298,396 B1 * 5/2019 Kurani ................. G06F 21/33
(Continued)

FOREIGN PATENT DOCUMENTS

KR   1020030043562   6/2003
WO   2004/021638 A1   3/2004

OTHER PUBLICATIONS

Allen et. al, "Decentralized Public Key Infrastructure", 2015.*
Fromknecht et. al, "A Decentralized Public Key Infrastructure with Identity Retention", Nov. 11, 2014.*

*Primary Examiner* — Steven S Kim
(74) *Attorney, Agent, or Firm* — Husch Blackwell LLP

(57) ABSTRACT

A method for creating and registering the authentication information is provided. The method includes steps of: (a) an intermediate server determining whether the specific user's public key is registered if (i) the specific user's public key and (ii) a hash value of the specific user's information or its processed value are acquired from the biometric authentication server which received a request for registration of authentication information; and (b) the intermediate server, if the specific user's public key is determined to be unregistered and at least one certain anchoring condition is satisfied, registering with a database a representative hash value or its processed value in a certain data structure, wherein the representative hash value is created by using (1) a specific hash value and (2) at least one hash value of at least one neighboring node which corresponds to a node of the specific hash value.

22 Claims, 7 Drawing Sheets

(52) U.S. Cl.
CPC .......... *H04L 9/3239* (2013.01); *H04L 9/3268* (2013.01); *G06Q 2220/00* (2013.01); *H04L 2209/38* (2013.01); *H04L 2209/56* (2013.01)

(58) Field of Classification Search
CPC .............. H04L 9/3239; H04L 2209/56; H04L 2209/38
See application file for complete search history.

(56) References Cited

U.S. PATENT DOCUMENTS

| | | | | |
|---|---|---|---|---|
| 2006/0248348 | A1* | 11/2006 | Wakao | H04N 1/32101 713/186 |
| 2008/0016357 | A1* | 1/2008 | Suarez | H04L 63/0823 713/176 |
| 2011/0012711 | A1* | 1/2011 | Abe | G06F 21/32 340/5.82 |
| 2012/0096564 | A1 | 4/2012 | Li | |
| 2013/0185214 | A1* | 7/2013 | Azen | G06Q 20/206 705/76 |
| 2015/0244690 | A1* | 8/2015 | Mossbarger | H04L 63/061 713/171 |
| 2016/0191243 | A1* | 6/2016 | Manning | H04L 61/1511 713/168 |
| 2016/0300223 | A1* | 10/2016 | Grey | G06Q 20/3825 |
| 2016/0328713 | A1* | 11/2016 | Ebrahimi | H04L 9/3066 |
| 2016/0342976 | A1* | 11/2016 | Davis | G06Q 20/3829 |
| 2017/0012780 | A1* | 1/2017 | Kaliski, Jr. | H04L 9/3247 |
| 2017/0012943 | A1* | 1/2017 | Kaliski, Jr. | H04L 63/0428 |
| 2017/0302460 | A1* | 10/2017 | Song | H04L 9/3268 |
| 2017/0316497 | A1* | 11/2017 | Song | G06Q 40/02 |

* cited by examiner

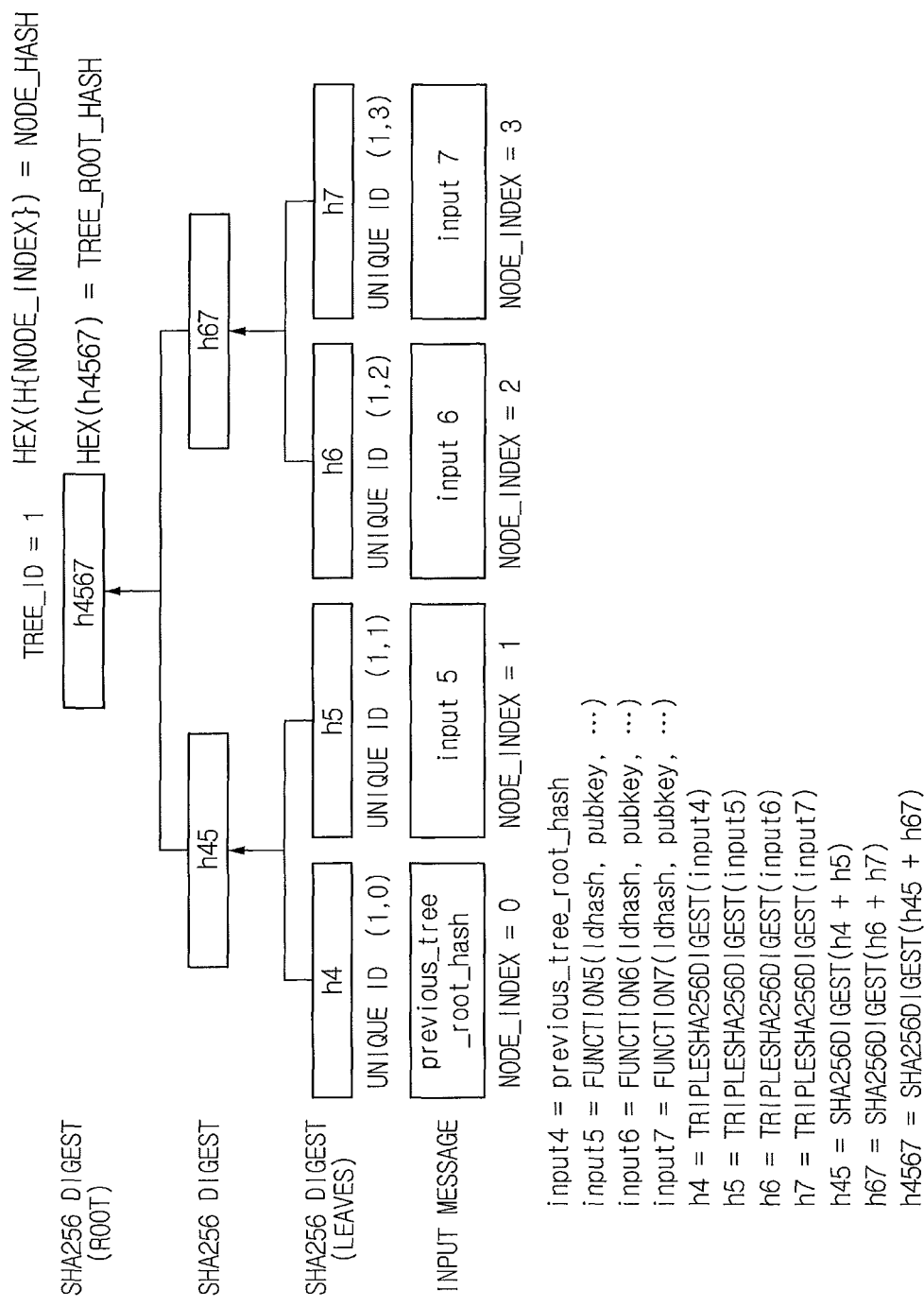

METHOD FOR CREATING, REGISTERING, REVOKING AUTHENTICATION INFORMATION AND SERVER USING THE SAME

CROSS REFERENCE TO RELATED APPLICATION

This application claims priority to and incorporates herein by reference all disclosure in Korean Patent Application No. 10-2016-0051936 filed Apr. 28, 2016.

FIELD OF THE INVENTION

The present invention relates to a method for creating, registering, revoking authentication information and an intermediate server using the same; and more particularly, to the method of (a) a registration process of the authentication information, wherein, if a specific user's public key and a hash value of the specific user's information or its processed value are acquired from a biometric authentication server which received a request for registration of authentication information, whether or not the specific user's public key is registered is examined, and then if the specific user's public key is determined to be unregistered and at least one certain anchoring condition is satisfied, a representative hash value or its processed value is registered with a database in a certain data structure, the representative hash value being created by using (1) a specific hash value which is a hash value of (i) the specific user's public key and (ii) the hash value of the specific user's information or its processed value and (2) at least one hash value of at least one neighboring node which corresponds to a node of the specific hash value and (b) a revocation process of the authentication information, wherein, if the specific user's public key and the hash value of the specific user's information or its processed value are acquired from the biometric authentication server that received a request for revoking authentication information, whether or not the specific user's public key is registered is examined, and then if the specific user's public key is determined to be registered and at least one certain anchoring condition is satisfied, the representative hash value or its processed value is registered with a database in a certain data structure, the representative hash value being created by using (1) a specific hash value which is a hash value of (i) the specific user's public key and (ii) the hash value of the specific user's information or its processed value and (2) at least one hash value of at least one neighboring node which corresponds to a node of the specific hash value, to thereby perform revocation of the authentication information.

BACKGROUND OF THE INVENTION

A biometric authentication technology is a technology used for authentication by utilizing unique personal information on biometric traits like fingerprints, irises, faces, and voices. The biometric authentication technology is secure and easy to use as it uses unique biometric information and, recently, a user authentication technology which is combined with biometric authentication technologies like FIDO (Fast Identity Online) has become popular.

Recently, a blockchain technology of virtual currency is popular in a financial industry where a high level of security is needed, because forgery and falsification of description of transactions recorded in the blockchain are impossible.

The present inventor has invented a technology that can create authentication information based on a Public Key Infrastructure (PKI) and that can register and manage the information in the blockchain for secure financial transactions, by integrating a blockchain technology into the biometric authentication technology.

Though, it may be very ineffective to access the blockchain and record authentication information in the blockchain for all cases in need of registration thereof in the blockchain. Especially, a bottle neck may occur when transactions are increased, and a total cost may become high because the transaction fee must be paid every time.

Thus, the present inventor invented a system that can register the authentication information while preventing forgery and falsification, recording the authentication information in real-time, guaranteeing a fast service even if the requests for the service pile up and reducing the cost.

SUMMARY OF THE INVENTION

It is an object of the present invention to solve all the aforementioned problems.

It is another object of the present invention to provide a technology that can create authentication information based on a Public Key Infrastructure (PKI) and that can register and manage the information in the blockchain, by combining a blockchain technology with a biometric authentication technology.

It is still another object of the present invention to create the authentication information and register the created authentication information with a database, if there is a request for registration and if a specific user's public key received from a biometric authentication server is determined to be unregistered.

It is still yet another object of the present invention to create revocation information and register the created revocation information with the database to thereby revoke the authentication information, if there is a request for revoking the registration and if the specific user's public key received from a biometric authentication server is determined to be registered.

It is still yet another object of the present invention to guarantee a fast service and reduce a transaction cost while registering and revoking the authentication information.

It is still yet another object of the present invention to improve service speed and reduce the transaction cost by configuring a Merkle tree by using the authentication information and registering only a root value of the Merkle tree with the blockchain instead of registering all of the authentication information with the blockchain.

In accordance with one aspect of the present invention, there is provided a method for creating and registering the authentication information, including steps of: (a) an intermediate server determining whether or not the specific user's public key is registered if (i) the specific user's public key and (ii) a hash value of the specific user's information or its processed value are acquired from the biometric authentication server which received a request for registration of authentication information; and (b) the intermediate server, if the specific user's public key is determined to be unregistered and at least one certain anchoring condition is satisfied, registering or supporting other device to register with a database a representative hash value or its processed value in a certain data structure, wherein the representative hash value is created by using (1) a specific hash value which is a hash value of (i) the specific user's public key and (ii) the hash value of the specific user's information or its processed value and (2) at least one hash value of at least one neighboring node which corresponds to a node of the specific hash value.

In accordance with another aspect of the present invention, there is provided a method for revoking the authentication information, including steps of: (a) the intermediate server determining whether or not the specific user's public key is registered, if (i) the specific user's public key and (ii) the hash value of the specific user's information or its processed value are acquired from the biometric authentication server that received a revocation request for revoking authentication information; and (b) the intermediate server, if the specific user's public key is determined to be registered and at least one certain anchoring condition is satisfied, registering or supporting other device to register with the database the representative hash value or its processed value in the certain data structure, wherein the representative hash value is created by using (1) the specific hash value which is a hash value of (i) the specific user's public key and (ii) the hash value of the specific user's information or its processed value and (2) at least one hash value of at least one neighboring node which corresponds to the node of the specific hash value, to thereby perform revocation of the authentication information.

In accordance with still another aspect of the present invention, there is provided a server for creating and registering authentication information, including: a communication part for acquiring (i) a specific user's public key, and (ii) a hash value of the specific user's information or its processed value from a biometric authentication server which received a request for registration of authentication information; and a processor, if the specific user's public key is determined to be unregistered and at least one certain anchoring condition is satisfied, for registering or supporting other device to register with a database a representative hash value or its processed value in a certain data structure, wherein the representative hash value is created by using (1) a specific hash value which is a hash value of (i) the specific user's public key and (ii) the hash value of the specific user's information or its processed value and (2) at least one hash value of at least one neighboring node which corresponds to a node of the specific hash value.

In accordance with still yet another aspect of the present invention, there is provided a server for revoking authentication information, including: a communication part for acquiring (i) a specific user's public key, and (ii) a hash value of the specific user's information or its processed value from a biometric authentication server which received a request for revocation of authentication information; and a processor, if (i) the specific user's public key and (ii) the hash value of the specific user's information or its processed value are acquired and if the specific user's public key is determined to be registered and at least one certain anchoring condition is satisfied, registering or supporting other device to register with a database a representative hash value or its processed value in a certain data structure, wherein the representative hash value is created by using (1) a specific hash value which is a hash value of (i) the specific user's public key and (ii) the hash value of the specific user's information or its processed value and (2) at least one hash value of at least one neighboring node which corresponds to a node of the specific hash value, to thereby perform revocation of the authentication information.

BRIEF DESCRIPTION OF THE DRAWINGS

The above and other objects and features of the present invention will become apparent from the following description of preferred embodiments given in conjunction with the accompanying drawings, in which:

FIGS. 6 and 7 are diagrams illustrating an example of a Merkle tree created in accordance with one example embodiment of the present invention.

DETAILED DESCRIPTION OF THE PREFERRED EMBODIMENTS

Figure 1:
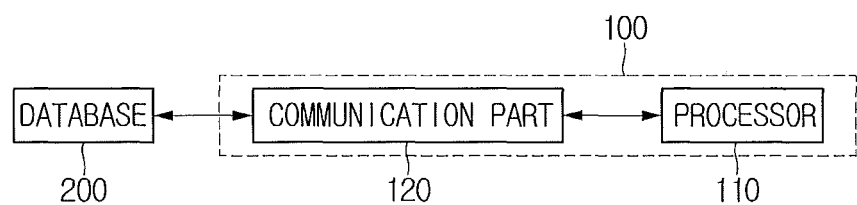
FIG. 1 is a block diagram illustrating a configuration of an intermediate server that creates and registers authentication information in accordance with one example embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 2:
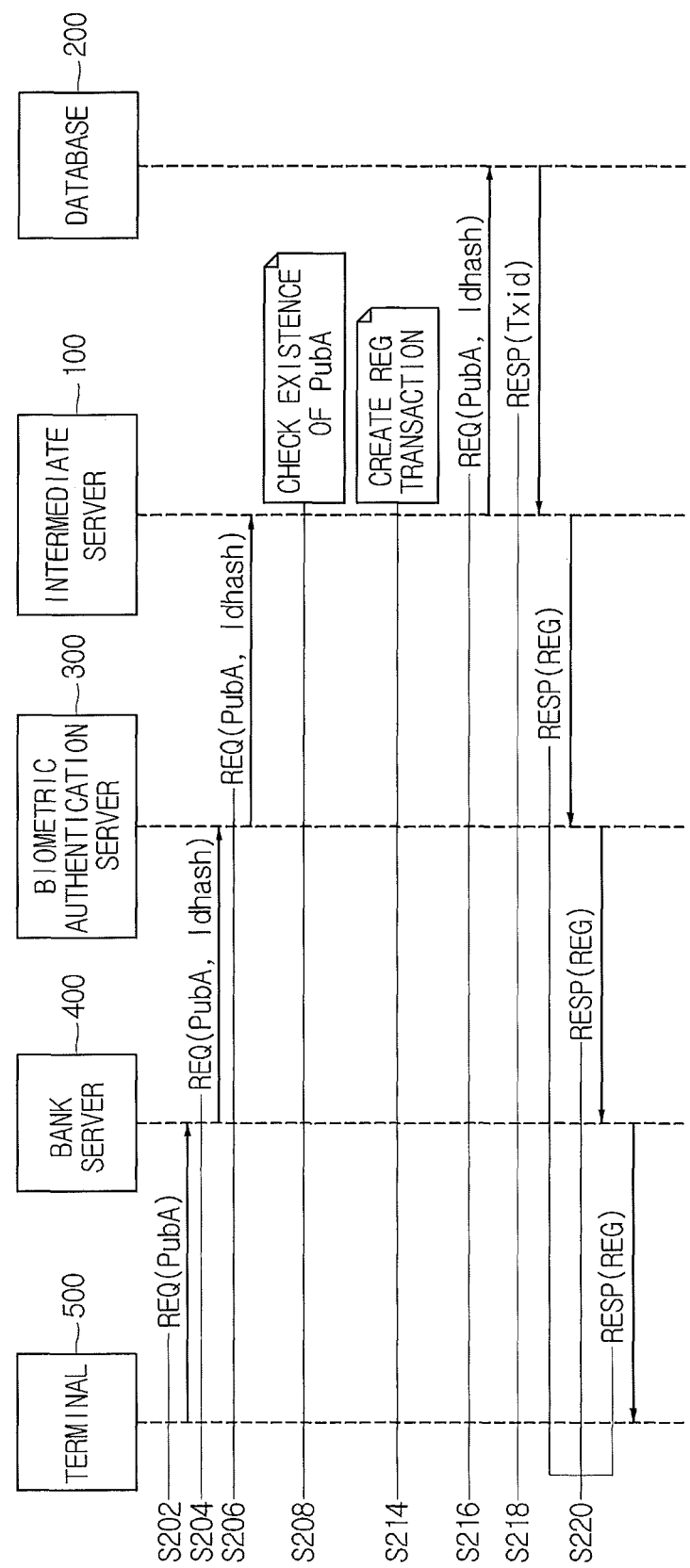
FIG. 2 is a sequence diagram illustrating a process of creation and registration of the authentication information in accordance with one example embodiment of the present invention.

FIG. 1 is a block diagram illustrating a configuration of an intermediate server that creates and registers authentication information in accordance with one example embodiment of the present invention and FIG. 2 is a sequence diagram illustrating a process of creation and registration of the authentication information in accordance with one example embodiment of the present invention.

By referring to FIG. 1, the intermediate server 100 that creates and registers the authentication information includes a processor 110 and a communication part 120 in accordance with one example embodiment of the present invention.

If (i) a specific user's public key and (ii) a hash value of the specific user's information or its processed value are acquired from a biometric authentication server 300 which received a request for registration of authentication information from a bank server 400, the processor 110 may determine whether or not the specific user's public key is registered. The biometric authentication server 300 may be a device that performs authentication of a user. For example, the biometric authentication server 300 may include a FIDO server.

By referring to FIG. 2, a terminal 500 creates the specific user's public key and transmits it to the bank server 400 at a step of S202. Herein, a private key may also be created. The specific user may register the specific user's information with a bank in advance, and this may support the authentication of the specific user. As an example, if a hash value of the specific user's, information and the specific user's public key are acquired, and if the acquired hash value matches a hash value of the specific user's information in the bank server 400, the authentication of the specific user may be achieved. Herein, the specific user's information may be information that can identify the user, which includes at least part of the specific user's name N, a birth date B, a mobile phone number #, and an email address E. If the specific user is authenticated, the bank server 400 may transmit a Uhash which is a hash value of the specific user's information to the biometric authentication server 300 at a step of S204. Herein, the specific user's public key may also be transmitted. If a user id is created by using the Uhash, the Idhash which is a hash value of the Uhash and the user id may be transmitted instead of the Uhash. The Idhash may be an SHA256 hash. The biometric authentication server 300 may transmit (i) the specific user's public key and (ii) the Uhash, as a hash value of the specific user's information, or a processed value of the Uhash to the intermediate server 100 at a step of S206. In this case, if the user id is created by using the Uhash, the processed value of the Uhash may be the Idhash which is a hash value of the Uhash and the user id. If (i) the specific user's public key and (ii) the hash value of the specific user's information or its processed value are acquired, the processor 110 may determine whether the specific user's public key is registered with a local database (not illustrated) at a step of S208. For reference, the terminal 500 may be a terminal device that can process the user's input and output, and may be one of a smart phone, a PC, a tablet PC and other electronic devices capable of handling the user's input and output.

The communication part 120 may communicate with the biometric authentication server 300 or a database 200. Herein, the database 200 may be a blockchain of virtual currency.

If the specific user's public key is determined to be registered at a step of S210 (not illustrated), since this means the authentication information is already registered, the communication part 120 may transmit an error message to the biometric authentication server 300 at a step of S212 (not illustrated). The error message is transmitted through the bank server 400 to the terminal 500.

At steps of S214 and S216, if the specific user's public key is determined to be unregistered, a transaction whose output includes (i) the specific user's public key and (ii) the hash value or its processed value may be created and transmitted to the database. Specifically, if the specific user's public key is determined to be unregistered, the communication part 120 may create a transaction including an output1 having (i) the specific user's public key and (ii) the hash value or its processed value (op_ msg1=pubkey:IDhash) and an output2 having a certain amount of virtual currency and transmit the created transaction to the database. The output2 may be used for revocation of the authentication information, as follows. The revocation of the authentication information may be performed by creating a new transaction, with the output2 as its input, and transmitting the new transaction to the database 200.

Further, the communication part 120 may acquire a transaction ID representing location information on where the transaction is recorded in the database 200 at a step of S218 and may transmit a notifying message to the biometric authentication server 300 that (i) the specific user's public key and (ii) the hash value or its processed value are successfully registered at a step of S220. The notifying message may be transmitted through the bank server 400 to the terminal 500.

The communication part 120 may be implemented by various communication technologies. In other words, WIFI, WCDMA (Wideband CDMA), HSDPA (High Speed Downlink Packet Access), HSUPA (High Speed Uplink Packet Access), HSPA (High Speed Packet Access), Mobile WiMAX, WiBro, LTE (Long Term Evolution), Bluetooth, IrDA (infrared data association), NFC (Near Field Communication), Zigbee or wireless LAN may be used. Further, if the service is provided via the Internet, TCP/IP which is a standard protocol for transmission of data on the Internet may be adopted.

The processor 110 may store the transaction ID, the hash value of the specific user's information or its processed value and the specific user's public key in the local database (not illustrated).

The processor 110 may control a data flow among a communication part 120 and other components. In other words, the processor 110 may control the communication part 120 and other components to perform their unique functions, by controlling the data flow among each component within the intermediate server 100.

The processor 110 may include hardware configuration of MPU (Micro Processing Unit) or CPU (Central Processing Unit), cache memory, data bus, etc. Additionally, OS and software configuration of applications that achieve specific purposes may be further included.

Configuration and operation of the intermediate server 100 which performs the revocation of the authentication information are explained as follows. An intermediate server which performs the revocation of the authentication information to be explained hereinafter may be a different device from the aforementioned intermediate server 100, however, they are considered to be identical for convenience of explanation.

Figure 3:
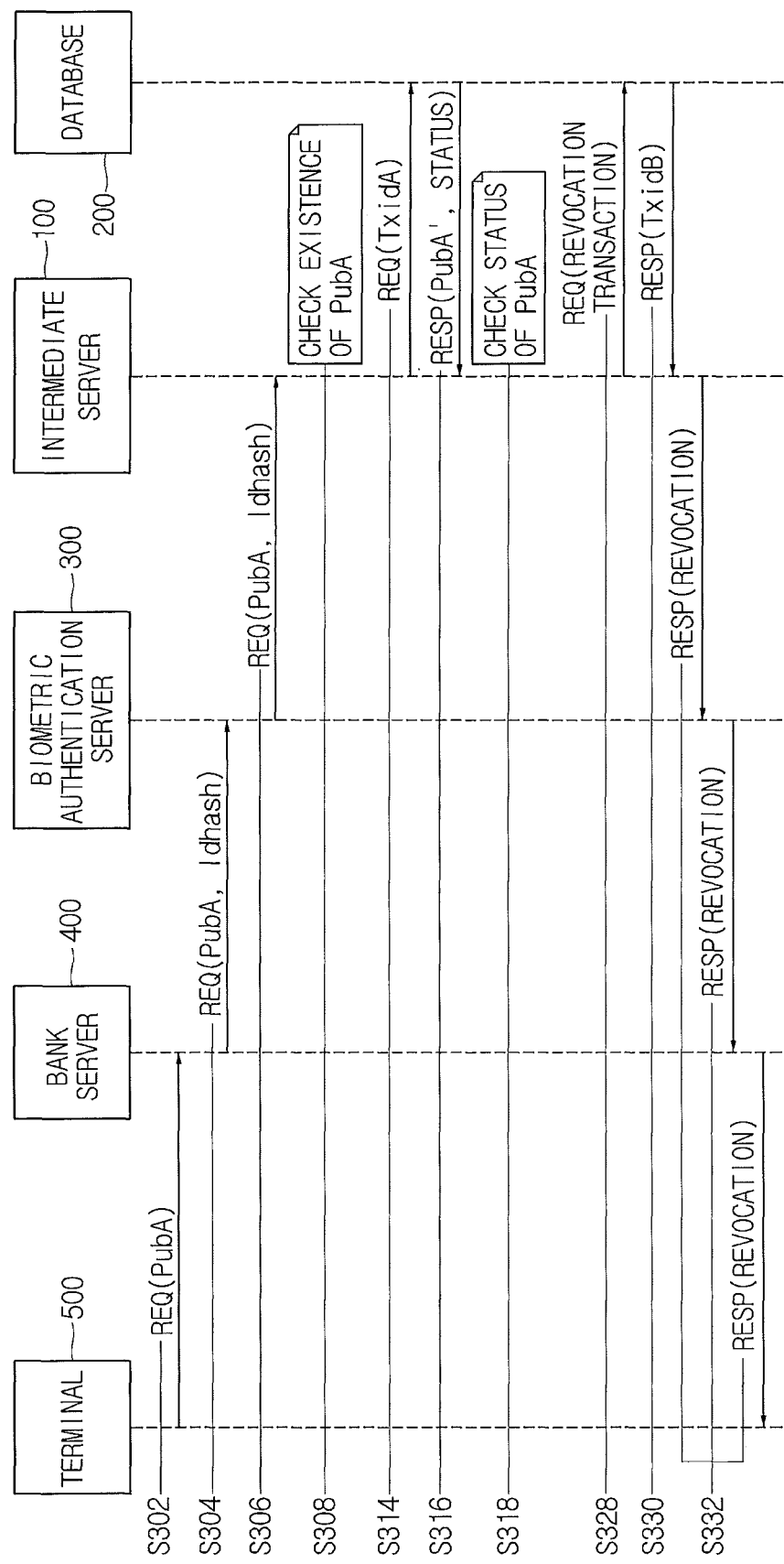
FIG. 3 is a sequence diagram illustrating a process of revocation of the authentication information in accordance with one example embodiment of the present invention.

FIG. 3 is a sequence diagram illustrating a process of revocation of the authentication information in accordance with one example embodiment of the present invention.

If the specific user's public key is acquired from the biometric authentication server 300 which received a request for revoking the authentication information from a bank server 400 like in the above-described process of creation and registration of the authentication information, the processor 110 may determine whether or not the specific user's public key is registered at a step of S308. A process prior to determining whether or not the specific user's public key is registered is performed similarly to the process of creation and registration of the authentication information.

First of all, the terminal 500 may transmit the specific user's public key to the bank server 400 a step of S302. If multiple users' public keys are stored in the terminal 500, a public key selected by a user may be transmitted to the bank server 400. Further, the public key may be selected by inputting biometric information like fingerprint information, face information, and iris information. The bank server 400 may perform authentication of the specific user. If the specific user is authenticated, the bank server 400 may transmit the Uhash which is a hash value of the specific user's information to the biometric authentication server 300 at a step of S304. Herein, the specific user's public key may also be transmitted. Clearly, the Idhash may be transmitted instead of the Uhash, as aforementioned. The biometric authentication server 300 may transmit (i) the specific user's public key and (ii) the Uhash or its processed value as the hash value of the specific user information or its processed value to the intermediate server 100, at a step of S306. Similarly, in this case, the processed value of the Uhash may be the Idhash. If (i) the specific user's public key and (ii) the hash value of the specific user's information or its processed value are acquired, the processor 110 may determine whether or not the specific user's public key is registered with the local database, at a step of S308.

If the specific user's public key is determined to be unregistered, since this means the authentication information is not registered, the communication part 120 may transmit an error message, at a step of S312 (not illustrated). The error message may be transmitted through the bank server 400 to the terminal 500.

If the specific user's public key is determined to be registered, the communication part 120 may acquire an output of a specific transaction corresponding to the transaction ID from the database 200 by using the transaction ID corresponding to the specific user's public key at steps of S314 and S316 and then if a new transaction whose input includes at least part of the above-described output is created, the communication part 120 may transmit the new transaction to the database 200, at a step of S328. Specifically, the processor 110 may allow an unsigned transaction whose input includes the at least part of the output which is a certain amount of virtual currency to be created, and may allow the unsigned transaction to be signed with a private key of the intermediate server 100, to thereby create a signed transaction and accordingly create the new transaction. The communication part 120 may acquire the transaction ID representing the location information on where the new transaction is recorded in the database 200 at a step of S330 and may notify the biometric authentication server 300 of a fact that the authentication information has been revoked at a step of S332. The notifying message may be transmitted through the bank server 400 to the terminal 500.

However, before performing this process, the communication part 120 may examine state information of the authentication information and may transmit the error message. In other words, if the specific user's public key is determined to be registered, the communication part 120 may acquire the specific user's public key and the state information of the authentication information as the output of the specific transaction corresponding to the transaction ID from the database 200 by using the transaction ID corresponding to the specific user's public key at a step of S316, and if the public key acquired from the database 200 does not match the specific user's public key acquired from the biometric authentication server 300 at s step of S320 (not illustrated) or the authentication information is determined to be in a certain state by referring to the state information of the authentication information at a step of S324, the communication part 120 may transmit the error message to the biometric authentication server 300 at steps of S322 (not illustrated) and S326 (not illustrated). The error message may be transmitted through the bank server 400 to the terminal 500. The certain state may include a revocation state or a state satisfying a certain condition of a contract.

Hereinafter, configuration and operation of the intermediate server using the authentication information are explained. The intermediate server explained hereinafter may be a different device from the aforementioned intermediate server 100, however, they are considered to be identical for convenience of explanation.

Figure 4:
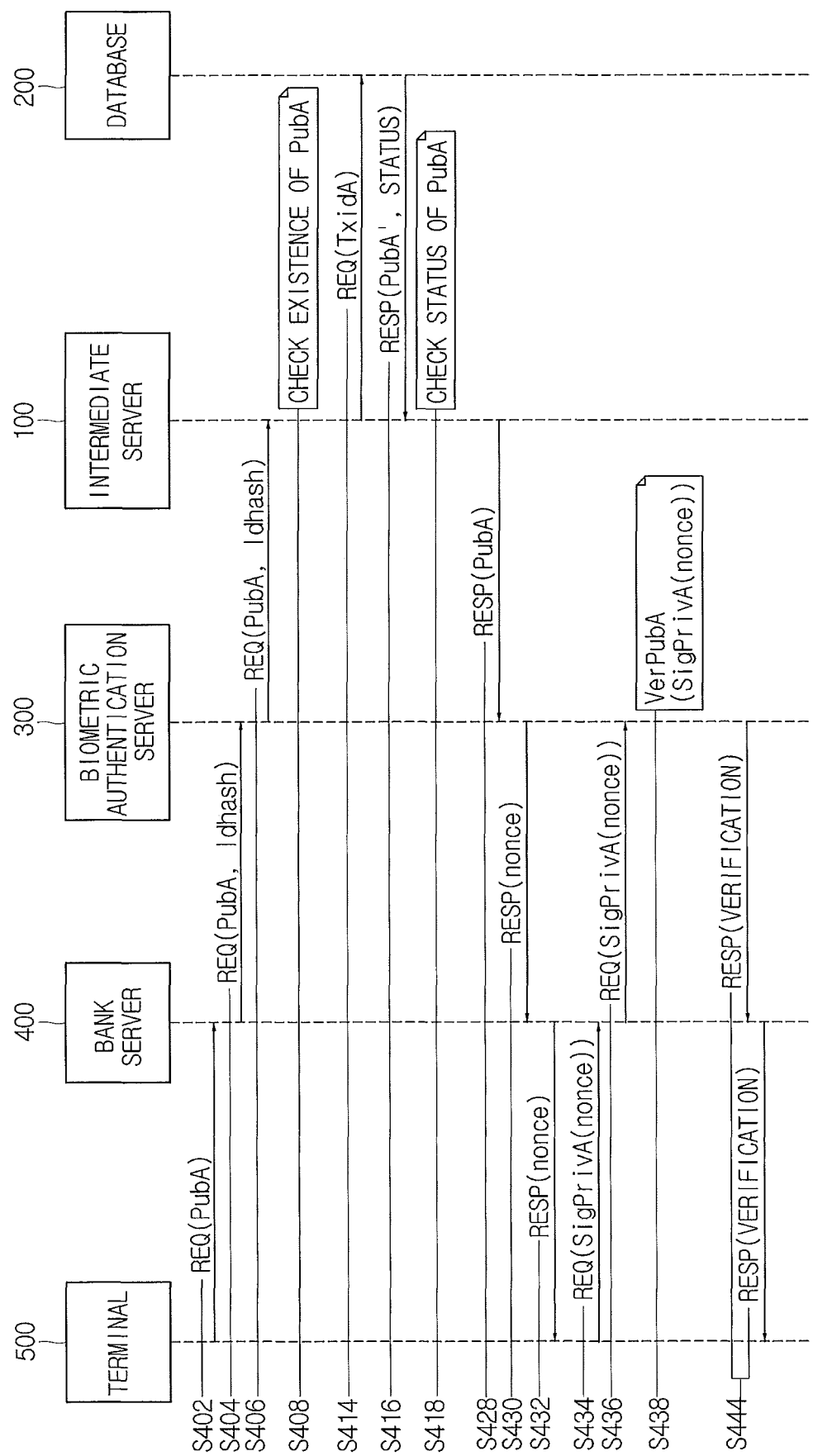
FIG. 4 is a sequence diagram illustrating a process of using the authentication information at the time of login in accordance with another example embodiment of the present invention.

FIG. 4 is a sequence diagram illustrating a process of using the authentication information at the time of login in accordance with another example embodiment of the present invention.

By referring to FIG. 4, if the specific user's public key is acquired from the biometric authentication server 300 which received a request for using the authentication information from the bank server 400, the processor 110 may determine whether or not the specific user's public key is registered, at a step of S408.

As processes performed before determining whether or not the specific user's public key is registered are similar to the processes of creating, registering, revoking the authentication information, detailed explanation thereon is omitted.

If the specific user's public key is determined to be unregistered at a step of S410 (not illustrated), since it means that the authentication information is not available, the communication part 120 may transmit an error message to the biometric authentication server 300 at a step of S412 (not illustrated). In this case, the biometric authentication server 300 may transmit the error message to the bank server 400 and the bank server 400 may transmit the error message to the terminal 500.

If the specific user's public key is determined to be registered, the communication part 120 may transmit the specific user's public key to the biometric authentication server 300 at a step of S428, or may allow the biometric authentication server 300 to use the specific user's public key managed by itself to thereby allow the biometric authentication server 300 to (i) create a random nonce, (ii) verify a value acquired by signing the created random nonce with a private key corresponding to the specific user's biometric information by using the specific user's public key at a step of S438 and (iii) transmit a message about the verification result to the bank server 400 at a step of S444.

More specifically, if the specific user's public key is determined to be registered, the communication part 120 may transmit the specific user's public key to the biometric authentication server 300 at a step of S428 or may allow the specific user's public key managed in the biometric authentication server 300 to be used by the biometric authentication server 300, and the biometric authentication server 300 may create the random nonce. The biometric authentication server 300 may transmit the created random nonce to the bank server 400 at a step of S430. The bank server 400 may transmit the received random nonce to the terminal 500, at a step of S432. The terminal 500, after receiving the random nonce, may acquire the specific user's biometric information by a process of acquiring, e.g., a fingerprint, and the terminal 500 may sign the random nonce with a private key corresponding to the specific user's biometric information and then may transmit the signed random nonce to the bank server 400, at a step of S434. The bank server 400 may transmit the signed random nonce to the biometric authentication server 300, at a step of S436. The biometric authentication server 300 may verify the signed random nonce by using the specific user's public key, at a step of S438. If the result of verification is a non-match at a step of S440 (not illustrated), the biometric authentication server 300 may transmit a message indicating that the biometric information the specific user inputted is incorrect, at a step of S442 (not illustrated). The message may be transmitted through the bank server 400 to the terminal 500. If the result of verification is a match, the biometric authentication server 300 may transmit a message indicating the verification is successful and may assist in performing a normal login, at a step of S444. For reference, the user's biometric information may be at least part of iris information, fingerprint information and face information.

However, before performing these processes, the communication part 120 may examine the state information of the authentication information and may transmit the error message. In other words, if the specific user's public key is determined to be registered, the communication part 120 may acquire the specific user's public key and the state information of the authentication information as the output of the specific transaction corresponding to the transaction ID from the database 200 by referring to the transaction ID corresponding to the specific user's public key at a step of S416, and if the public key acquired from the database 200 does not match the specific user's public key acquired from the biometric authentication server 300 at s step of S420 (not illustrated) or the authentication information is determined to be in a certain state by referring to the state information of the authentication information at a step of S424 (not illustrated), the communication part 120 may transmit the error message to the biometric authentication server 300 at steps of S422 (not illustrated) and S426 (not illustrated). The error message may be transmitted through the bank server 400 to the terminal 500. The state may be a state of revocation or a state satisfying a certain condition of a contract.

Figure 5:
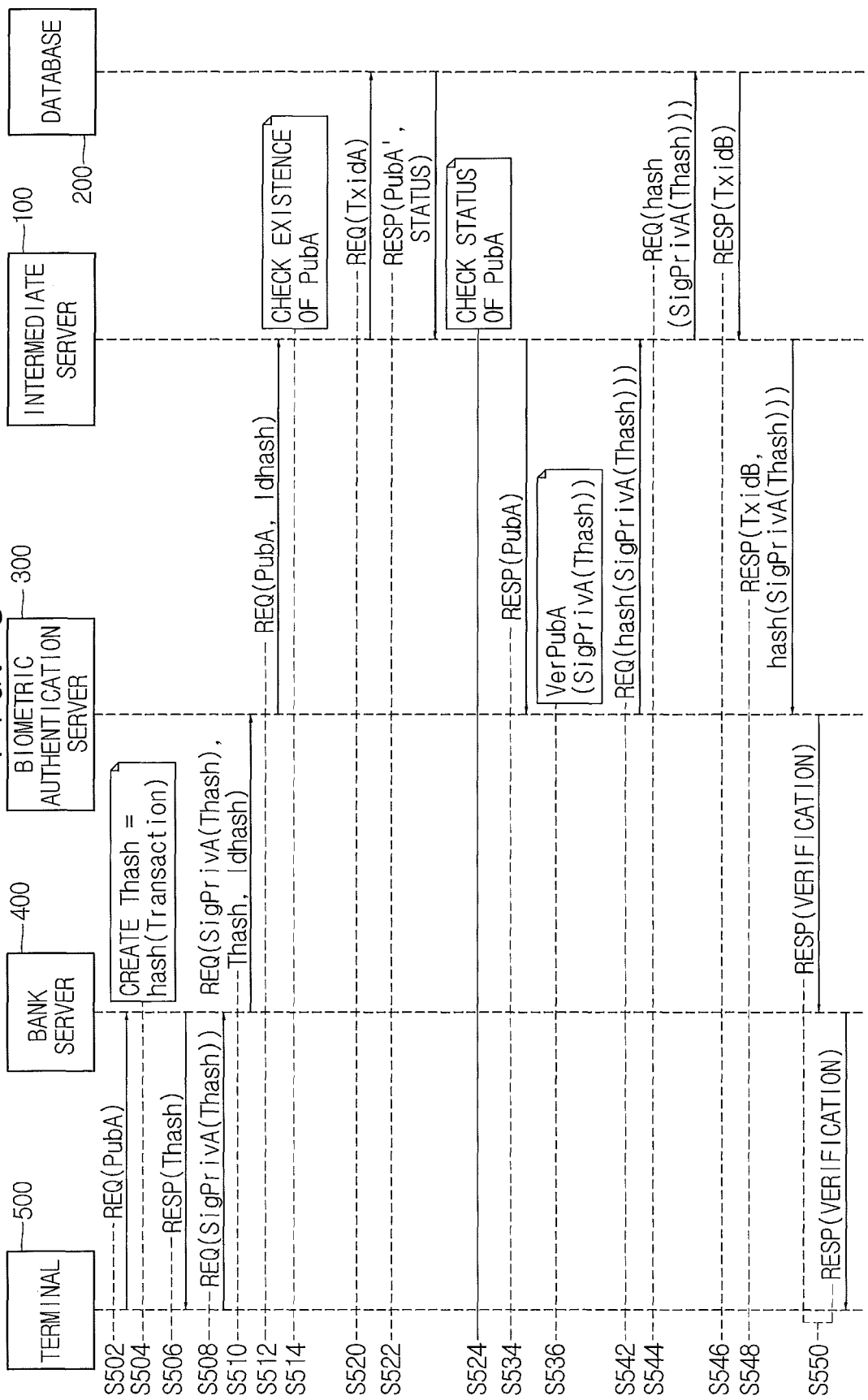
FIG. 5 is a sequence diagram illustrating a process of using the authentication information at the time of a transaction in accordance with still another example embodiment of the present invention.

FIG. 5 is a sequence diagram illustrating a process of using the authentication information at the time of a transaction in accordance with still another example embodiment of the present invention.

By referring to FIG. 5, if the specific user's public key is acquired from the biometric authentication server 300 which received a request for using the authentication information from the bank server 400, the processor 110 may determine whether or not the specific user's public key is registered, at a step of S514.

As processes performed before determining whether or not the specific user's public key is registered are similar to the processes of creating, registering, revoking the authentication information, detailed explanation thereon is omitted.

If the specific user's public key is determined to be unregistered at a step of S516 (not illustrated), the communication part 120 may transmit to the biometric authentication server 300 an error message indicating that the specific user's public key is not registered, at a step of S518 (not illustrated). The error message may be transmitted through the bank server 400 to the terminal 500.

However, if the specific user's public key is determined to be registered, the communication part 120 may transmit the specific user's public key to the biometric authentication server 300 at a step of S534, or may allow the biometric authentication server 300 to use the specific user's public key managed by itself to thereby allow the biometric authentication server 300 to (i) verify a value acquired by signing a Thash, which is a hash value of the transaction information, or its processed value, with a private key corresponding to the specific user's biometric information by using the specific user's public key at a step of S536, (ii) transmit a message about the verification result to the bank server 400 at steps of S538 (not illustrated) an S540 (not illustrated).

More specifically, the bank server 400 may create the Thash which a hash value of the transaction information or its processed value at a step of S504, and may transmit it to the terminal 500 at a step of S506. Herein, the Thash means hash(Transaction). If the specific user's biometric information is acquired, the terminal 500 may transmit a value A acquired by signing the Thash or its processed value with the private key corresponding to the specific user's biometric information to the bank server 400 at a step of S508. Then, the bank server 400 may transmit the value A to the biometric authentication server 300. Herein, the specific user's public key, Thash, Idhash, etc. may be transmitted together. Clearly, the specific user's public key, Idhash, etc. may be transmitted in advance. In other words, the Thash and the Idhash are transmitted to the biometric authentication server 300 at the same time and the specific user's public key and the Idhash are transmitted from the biometric authentication server 300 to the intermediate server 100 and then whether the specific user's public key is registered may be determined as illustrated in FIG. 5. However, the Thash may be created and transmitted regardless of transmission and registration confirmation of the specific user's public key and transmission of the Idhash.

Meanwhile, if the result of verification is a non-match at a step of S538 (not illustrated), the communication part 120 may transmit a message indicating that the biometric information the specific user inputted is incorrect, at a step of S540 (not illustrated). The notifying message may be transmitted through the bank server 400 to the terminal 500.

However, before performing these processes, the communication part 120 may examine the state information of the authentication information and may transmit the error message. In other words, if the specific user's public key is determined to be registered, the communication part 120 may acquire the specific user's public key and the state information of the authentication information as the output of the specific transaction corresponding to the transaction ID from the database 200 by using the transaction ID corresponding to the specific user's public key at a step of S522, and if the public key acquired from the database 200 does not match the specific user's public key acquired from the biometric authentication server 300 at a step of S526 (not illustrated) or the authentication information is determined to be in a certain state by referring to the state information of the authentication information at a step of S530 (not illustrated), the communication part 120 may transmit the error message to the biometric authentication server 300 at steps of 5528 (not illustrated) and 5532 (not illustrated). The error message may be transmitted through the bank server 400 to the terminal 500. The state may be a state of revocation or a state satisfying a certain condition of a contract.

The communication part 120 may transmit X1 which is acquired by signing a hash value of the transaction information or its processed value with the private key or X2 which is a hash value of the X1 to thereby allow the X1 or the X2 to be recorded in the database 200, at a step of S544. The purpose of this process is to prevent denial of the transaction.

The communication part 120 may acquire a transaction ID representing location information on where the X1 or the X2 is recorded in the database 200 and may transmit the acquired transaction ID to the biometric authentication server 300, at a step of S548. The transaction ID may be transmitted through the bank server 400 to the terminal 500.

The intermediate server 100 in accordance with various example embodiments of the present invention may provide a technology for creating, registering and managing the authentication information by combining the blockchain technology with the biometric authentication technology.

On the other hand, it may be very ineffective to access the database 200 and record the authentication information in the database 200 for all cases in need of registration thereof in the database 200. Especially, a bottle neck may occur when the transactions are increased, and a total cost may become high because the transaction fee must be paid every time.

Hereinafter, a system is explained that can register and revoke the authentication information, prevent forgery and falsification, register the authentication information in real-time, guarantee a fast service even if the requests for the service pile up and reduce the cost. Such a system uses a data structure managed by the intermediate server 100, as opposed to the aforementioned example embodiment. The intermediate server explained hereinafter may be a different device from the aforementioned intermediate server 100, however, they are considered to be identical for convenience of explanation.

Similarly to the aforementioned embodiment, the communication part 120 may acquire (i) the specific user's public key and (ii) the hash value of the specific user's information or its processed value from the biometric authentication server 300 which received a request for registration of the authentication information.

Herein, if the specific user's public key is created in the terminal 500 and transmitted to the bank server 400, and if the specific user is authenticated and the Uhash which is a hash value of the specific user's information is transmitted from the bank server 400 to the biometric authentication server 300, (i) the specific user's public key and (ii) the Uhash or its processed value may be transmitted from the biometric authentication server 300 to the intermediate server 100, by referring to FIG. 2 and its explanation. As an authentication method of the specific user was explained in the aforementioned embodiment, detailed explanation thereon is omitted. If the user id is created by using the Uhash, the Idhash which is a hash value of the user id and the Uhash, may be transmitted instead of the Uhash. The Idhash may be SHA256 hash.

If (i) the specific user's public key and (ii) the hash value of the specific user's information or its processed value are acquired, the processor 110 may determine whether or not the specific user's public key is registered. If the specific user's public key is determined to be unregistered and if at least one certain anchoring condition is satisfied, the processor 110 may register or support other device to register with the database 200 the representative hash value or its processed value in a certain data structure, where the representative hash value is created by operating (1) a specific hash value which is a hash value of (i) the specific user's public key and (ii) the hash value of the specific user's information or its processed value and (2) at least one hash value of at least one neighboring node which corresponds to a node of the specific hash value.

The operation of (i) the specific hash value and (ii) the at least one hash value of the at least one neighboring node which corresponds to the node of the specific hash value may be performed by various functions. Let the specific hash value be input and let the at least one hash value of the at least one neighboring node be x1, x2, . . . , xn, then the representative hash value t may be expressed as the mathematical formula as follows.

<Mathematical Formula>

$t = \text{hash}(\text{function}(\text{input}, x1, x2, \ldots, xn))$

Herein, the intermediate server 100 may store and manage the specific hash value and the at least one neighboring hash value in a certain data structure. Herein, the data structure may be a Merkle tree but it is not limited thereto. In this case, the operation of (i) the specific hash value and (ii) at least one hash value of at least one neighboring node which corresponds to the node of the specific hash value may be performed by the Merkle tree.

In other words, the processor 110 may create or support other device to create the Merkle tree whose specific leaf node has the specific hash value, and if the specific user's public key is determined to be unregistered and the at least one certain anchoring condition is satisfied, the processor 110 may register or support other device to register with the database 200 the representative hash value or its processed value in the certain data structure, wherein the representative hash value is created by using (1) the specific hash value which is the hash value of (i) the specific user's public key and (ii) the hash value of the specific user's information or its processed value and (2) at least one hash value of at least one neighboring node which corresponds to the node of the specific hash value.

More specifically, in this case (x1) the processor 110 may operate (i) the specific hash value a specific node and (ii) a hash value allocated to a sibling node of the specific node, to thereby acquire a resultant value, and may allocate or support other device to allocate a hash value of the resultant value to a parent node of the specific node. (x2) If the parent node is a root node of the Merkle tree, the hash value allocated to the parent node becomes the representative hash value. (x3) However, if the parent node is not the root node of the Merkle tree, the processor 110 may repeat the process from (x1) to (x2) with the hash value allocated to the parent node as the specific hash value.

The processor 110 register or support other device to register the hash value allocated to the root node of the Merkle tree ultimately as the representative hash value with the database 200. As the case maybe, a processed value of the representative hash value may be registered. For example, a resultant value acquired by applying hex operation to the representative hash value may be registered.

Meanwhile, a first data structure and a second data structure may be connected in a form of a chain if the intermediate server 100 stores the specific hash value and the at least one neighboring hash value in the first data structure and :then stores and manages the second data structure identical in a form to the first data structure.

Especially, as an example aforementioned, if the first data structure and the second data structure are the Merkle trees, a root value of the first data structure or a hash value of the root value may be allocated to a first leaf node of the second data structure. Moreover, data integrity may be further ensured by verifying the first data structure when the second data structure is generated.

Further, in case of the first Merkle tree among at least two Merkle trees connected in a form of a chain, a hash value of a certain message data comprised of text, number or symbol or a processed value of the hash value may be allocated to a first leaf node of the first Merkle tree. For example, at the time of creation of the Merkle tree, a hash value of an input message firstly given by the intermediate server 100 may be allocated.

Figure 6:
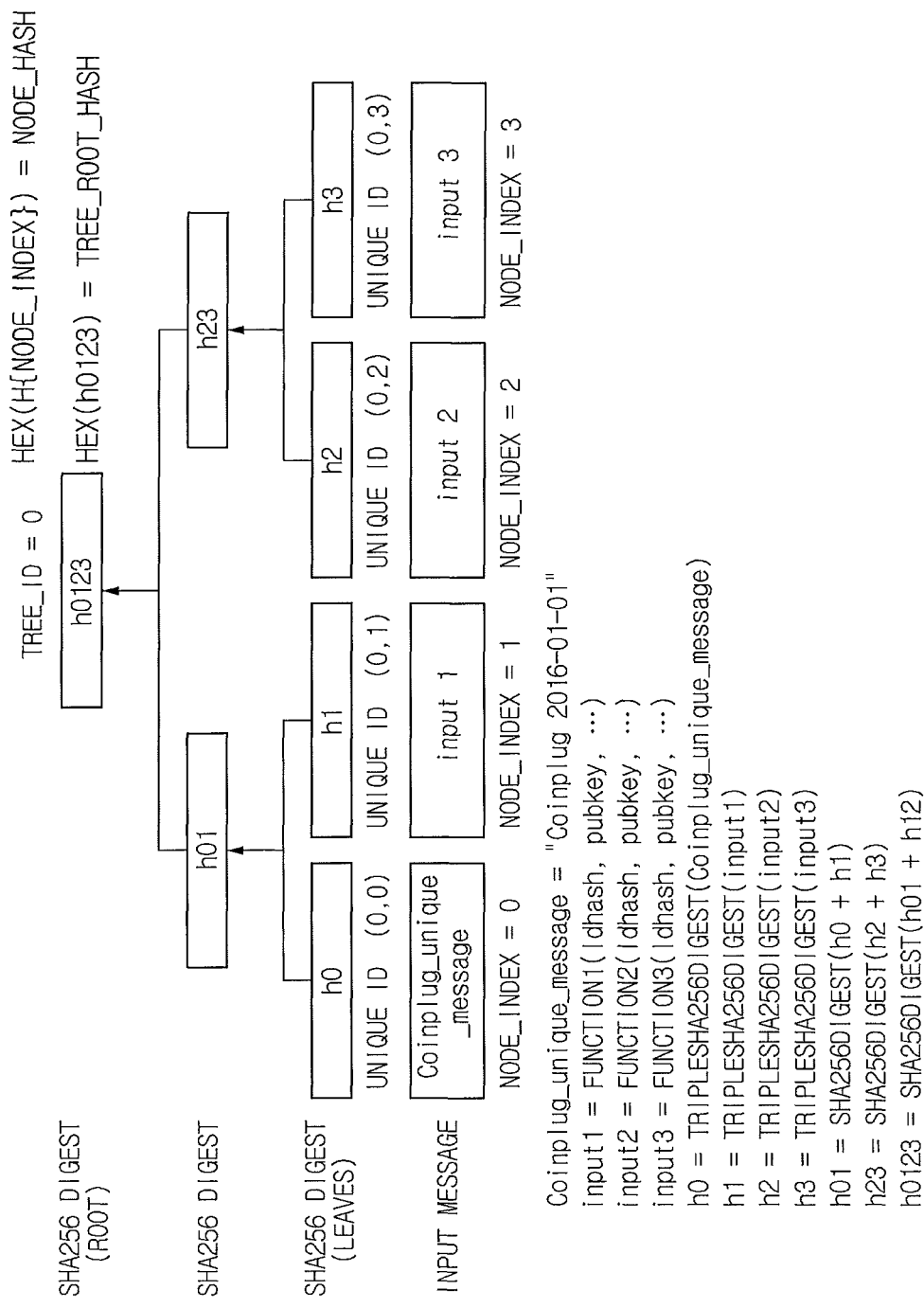

FIGS. 6 and 7 are diagrams illustrating an example of the Merkle tree created in accordance with one example embodiment of the present invention.

FIG. 6 illustrates the Merkle tree with four ($2^2$) leaf nodes. As the illustrated Merkle tree is the first Merkle tree whose tree_id is zero, a hash value (triplesha256digest(coinplug_unique_message)) of a certain message data "Coinplug 2016-01-01" is allocated to a node h0 which is the first leaf node. If there is a request for registering the authentication information, the processor 110 may create a next leaf node following a last leaf node of the Merkle tree which is being configured and may allocate or support other device to allocate (i) the specific user's public key and (ii) the specific hash value or its processed value. For example, if value allocation was completed up to the node h1 in FIG. 6 at previous steps, the node h2 which is the next leaf node may be created and the specific hash value or its processed value (triplesha256digest(input2)) may be allocated to the node h2. Further, the processor 110 may operate or support other device to operate (i) the hash value allocated to the node h0 and (ii) the hash value allocated to the node h1 which is a sibling node of the node h0, to thereby acquire an operated value to be allocated to a node h01 which is a parent node of the node h0 and the node h1. Furthermore, the processor 110 may operate or support other device to operate (i) the hash value allocated to the node h2 and (ii) a hash value allocated to a node h3 which is a sibling node of the node h2, to thereby acquire an operated value to be allocated to a node h23 which is a parent node of the node h2 and the node h3. As the parent nodes, e.g., the node h01 and the node h23, are not the root node, e.g., a node h0123 of the Merkle tree, the processor 110 may repeat the processes until reaching the root node. Herein, as the node h0123 is the root node of the Merkle tree, the processor 110 may register or support other device to register a processed value (HEX (H{NODE_INDEX})) of the hash value allocated to the node h0123 with the database 200.

The certain anchoring condition aforementioned may include at least one of (i) a condition that a certain number of (i-1) user's public key and (i-2) a hash value of user's information or its processed value are acquired, (ii) a condition that a certain amount of time is elapsed, (iii) a condition that a block is created in a blockchain and (iv) a condition that relates to service characteristics.

For example, the processor 110 may create a root value of a Merkle tree at stated intervals like the condition (ii). In this case, if a certain amount of time is elapsed, the processor 110 may register or support other device to register the root value of the Merkle tree with the database 200.

However, there is a possibility that a value may not be allocated to a sibling node of the node to which a specific hash value is allocated even though a certain amount of time is elapsed. In case any hash value is not allocated to the sibling node even though a certain condition is met, the processor 110 may allocate or support other device to allocate a certain hash value to the sibling node to thereby allow a root value of the Merkle tree to be computed. For example, the processor 110 may copy the specific hash value and allocate or support other device to allocate the specific hash value to the sibling node.

The service characteristics may be at least part of information on cost paid by a user or a company that requested registration of the authentication information, information on a time-zone during which the registration of the authentication information is performed, information on location where the registration service of the authentication information is provided and information on a type of a company that requested registration of the authentication information. However, it is not limited to these.

If the certain condition, e.g., a time condition, is satisfied without any request for registration of the authentication information, the processor 110 may create or support other device to create a Merkle tree whose first and second leaf nodes have a certain message data which may be an arbitrary message data and may register or support other device to register the root value of the Merkle tree or its processed value with the database 200. In this case, the Merkle tree with the two leaf nodes may be created. Clearly, it is not limited to the Merkle tree with the two nodes.

As aforementioned, if the intermediate server 100 stores the specific hash value and the at least one neighboring hash value in the first data structure and then stores and manages the second data structure identical in a form to the first data structure, the first data structure and the second data structure may be connected in a form of a chain. Especially, if the first data structure and the second data structure are Merkle trees, a root value of the first data structure or a hash value of the root value may be allocated to a first leaf node of the second data structure.

FIG. 7 is a diagram illustrating an example of the Merkle tree created in a form of the second data structure in accordance with one example embodiment of the present invention.

By referring to FIG. 7, it is clear that the root value HEX(h0123) of the Merkle tree whose tree_id is 0 in FIG. 6 is allocated to the first leaf node, e.g., a node h4, of a new Merkle tree whose tree_id is 1 as triplesha256digest(input4). In such a manner, the present invention has advantage of improving data integrity as tracking becomes easy even in the case of data forgery, by connecting multiple data structures.

If the specific user's public key is determined to be registered, since this means that the authentication information is already registered, the communication part 120 may transmit an error message to the biometric authentication server 300. The error message may be transmitted through the bank server 400 to the terminal 500. Clearly, it may also be transmitted directly to the terminal 500.

The specific hash value may be a hash value of (i) the specific user's public key, (ii) the hash value of the specific user's information or its processed value and (iii) a certain amount of virtual currency. Herein, (iii) the certain amount of virtual currency may be used to indicate whether or not the authentication information is revoked.

Further, the processor 110 may store a hash value of the specific user's information or its processed value, and the specific user's public key to a local database.

If the representative hash value or its processed value is registered with the database 200, the communication part 120 may acquire a transaction ID representing location information on where the hash value or its processed value is recorded on the database 200, and may transmit to the biometric authentication server 300 a message representing that (i) the specific user's public key and (ii) the hash value or its processed value are successfully registered. The message may be transmitted through the bank server 400 to the terminal 500. Clearly, it may also be transmitted directly to the terminal 500 or the bank server 400.

Hereinafter, a method of the intermediate server 100 to perform the revocation of the authentication information is explained.

As aforementioned, the communication part 120 may acquire (i) the specific user's public key and (ii) a hash value of the specific user's information or its processed value from the biometric authentication server 300 which received a request for revocation of the authentication information. Since processes prior to determining whether or not the specific user's public key is registered was already explained by referring to FIG. 3, detailed explanation thereon is omitted.

If (i) the specific user's public key and (ii) a hash value of the specific user's information or its processed value are acquired, the processor 110 may determine whether or not the specific user's public key is registered. If the specific user's public key is determined to be registered and at least one certain anchoring condition is satisfied, the processor 110 may register or support other device to register with the database 200 the representative hash value or its processed value in a certain data structure, where the representative hash value is calculated by using (1) a specific hash value which is a hash value of (i) the specific user's public key and (ii) the hash value of the specific user's information or its processed value and (2) at least one hash value of at least one neighboring node which corresponds to a node of the specific hash value, to thereby revoke the authentication information.

The process of revocation of the authentication information is performed similarly to the process of registration of the authentication information aforementioned. Thus, explanation on a detailed process of revocation is omitted. Further, the certain data structure may be a Merkle tree as aforementioned. Consequently, the registration or the revocation may be discerned according to the order in which each of the specific hash values is recorded in the certain data structure. In other words, the specific hash value recorded firstly in the data structure may represent the registration of the authentication information, and the specific hash value recorded secondly may represent the revocation of the authentication information.

Herein, if (i) the specific user's public key and (ii) the hash value of the specific user's information or its processed value match a certain pre-registered value, the specific user's public key is determined to be registered and thus the processor 110 may register or support other device to register with the database 200 the representative hash value or its processed value according to whether or not the certain anchoring condition is satisfied.

Further, whether or not the specific user's public key is registered may be determined by referring to a local database. In other words, if the specific user's public key is determined to be registered in the local database and if the certain anchoring condition is satisfied, the processor 110 may register or support other device to register with the database 200 the representative hash value or its processed value, wherein the representative hash value is created by using (1) the specific hash value which is the hash value of (i) the specific user's public key and (ii) the hash value of the specific user's information or its processed value and (2) at least one hash value of at least one neighboring node which corresponds to the node of the specific hash value, to thereby perform the revocation of the authentication information.

Especially, in case the certain data structure is a Merkle tree, if (i) the specific user's public key and (ii) the hash value of the specific user's information or its processed value are allocated to a certain leaf node in the Merkle tree and if the certain anchoring condition is satisfied, the intermediate server 100 registers or support other device to register with the database 200 the representative hash value or its processed value, wherein the representative hash value is created by using (1) the specific hash value which is the hash value of (i) the specific user's public key and (ii) the specific user's information or its processed value and (2) at least one hash value of at least one neighboring node which corresponds to the node of the specific hash value, to thereby perform the revocation of the authentication information.

On the other hand, if the specific user's public key is determined to be unregistered, or registered with at least two leaf nodes in the Merkle tree, the communication part 120 may transmit an error message to the biometric authentication server 300. Because if the specific user's public key is registered with the at least two leaf nodes of the Merkle tree, it means that both the registration process and the revocation process of the authentication information are completed. Thus, the authentication information is perceived as revoked. The error message may be transmitted through the bank server 400 to the terminal 500.

Hereinafter, a configuration and an operation of an intermediate server that may allow a user to log on by using aforementioned authentication information are explained. The intermediate server that may allow a user to log on may be a same device as the aforementioned intermediate server 100 or a different device from the aforementioned intermediate server 100, however, they are considered to be identical for convenience of explanation.

On the condition that the intermediate server 100 registered a first representative hash value, created by operating a first specific hash value and at least one neighboring hash value whose node matches the node of the first specific hash value, or its processed value in a certain data structure with the database 200, the communication part 120 may acquire (1) the specific user's public key and (2) a hash value of the specific user's information or its processed value when receiving a request for using the authentication information. Herein, the first specific hash value and the first representative hash value correspond to the specific hash value and the representative hash value, respectively.

Herein, the specific user's public key is transmitted to the bank server 400, and if the specific user is authenticated and the Uhash which is a hash value of the specific user's information is transmitted from the bank server 400 to the biometric authentication server 300 then (i) the specific user's public key and (ii) the Uhash or its processed value may be transmitted from the biometric authentication server 300 to the intermediate server 100. Since it was explained by referring to FIG. 4, detailed explanation thereon is omitted.

If a second representative hash value or its processed value corresponds to the first representative hash value or its processed value registered with the database 200, wherein the second representative hash value is created by operating the second specific hash value, i.e., a hash value of the specific user's public key and a hash value of the specific user's information or its processed value, and at least one neighboring hash value determined by referring to the certain data structure, matches the second specific hash value, the processor 110 may transmit the specific user's public key to the biometric authentication server 300 or allow the specific user's public key to be used by the biometric authentication server 300, to thereby allow the biometric authentication server 300 to (i) create a random nonce, (ii) verify the random nonce signed with the private key corresponding to the specific user's biometric information by using the specific user's public key if the specific user's biometric information is acquired by way of login of the specific user, and (iii) transmit a message about the verification result.

At the (ii), the random nonce may be signed with the private key corresponding to the specific user's biometric information by the terminal 500 and then transmitted through the bank server 400 to the biometric authentication server 300.

Further, if the verification result is a mismatch at the (iii), the processor 110 may transmit or support other device to transmit a message indicating that the login is denied because the biometric information inputted by the specific user is a mismatch.

The explanation on the first specific hash value aforementioned may also be applied to the second specific hash value. In other words, the operation of the second specific hash value and at least one neighboring hash value may be performed by various functions. Since it was explained, detailed explanation thereon is omitted.

If the second representative hash value or its processed value does not correspond to the first representative hash value or its processed value registered with the database 200 or if the authentication information is determined to be in a certain state as a result of referring to information on a state of the authentication information with regard to (1) the specific user's public key and (2) a hash value of the specific user's information or its processed value, the communication part 120 may transmit an error message to the biometric authentication server 300. For example, if the authentication information is determined as revoked, the communication part 120 may transmit an error message to the biometric authentication server 300.

Further, if (1) the specific user's public key and (2) a hash value of the specific user's information or its processed value are determined to be allocated to at least two leaf nodes in the Merkle tree, the communication part 120 may determine the authentication information as revoked and then transmit an error Message to the biometric authentication server 300.

If the request for using the authentication information is acquired, the processor 110 may acquire or support other device to acquire an OP message from the database 200 by referring to a certain transaction ID. Further, if the second representative hash value or its processed value corresponds to the first representative hash value or its processed value included in the OP message, the processor 110 may transmit the specific user's public key to the biometric authentication server 300 or allow the biometric authentication server 300 to use the specific user's public key managed by itself, to thereby perform the above-mentioned (i) to (iii).

The second representative hash value may be created by operating the second specific hash value of the specific leaf node and a hash value allocated to at least one other leaf node which corresponds to the specific leaf node of the second specific hash value in the Merkle tree.

In the process of verifying correspondence of the second representative hash value or its processed value with the first representative hash value or its processed value, the processor 110 may create or support other device to create a new Merkle tree. Herein, the Merkle tree created in the process of registration of the authentication information aforementioned may be used. In other words, the processor 110 may (y1) operate or support other device to operate (i) the second specific hash value and (ii) a hash value allocated to a sibling node of the specific node where the second specific hash value is allocated in the Merkle tree created earlier, and may allocate or support other device to allocate a hash value of the operated value to a parent node of the specific node in the new Merkle tree. Further, (y2) if the parent node is the root node of the new Merkle tree, the processor 110 may compare or support other device to compare a hash value allocated to the parent node as the second representative hash value with the value included in the OP message, and (y3) if the parent node is not the root node of the new Merkle tree, the processor 110 may repeat the steps of (y1) to (y2) with the hash value allocated to the parent node as the second specific hash value.

If the root value of the Merkle tree created lastly or its processed value corresponds to the first representative hash value or its processed value included in the OP message, the processor 110 may determine or support other device to determine (1) the specific user's public key and (2) a hash value of the specific user's information or its processed value as verified.

In accordance with the present invention, if a Merkle with $n^m$ (=N) leaf nodes is created at the step of the registration of the authentication information, the authentication information may be utilized by fast user verification in which operation whose amount corresponds to only the height log nN (=m) of the Merkle tree is performed at the step of use of the authentication information.

Hereinafter, a configuration and an operation of an intermediate server that may support transactions using the authentication information aforementioned are explained. The intermediate server explained hereinafter may be a same device as the aforementioned intermediate server 100 or a different device from the aforementioned intermediate server 100, however, they are considered to be identical for convenience of explanation. For reference, in the example embodiment below, words like a first specific hash value, a second specific hash value, a first representative hash value, and a second representative hash value are repeated, however, they may not be identical across embodiments.

On the condition that the intermediate server 100 registered a first representative hash value, created by operating a first specific hash value and at least one neighboring hash value of at least one node corresponding to the node of the first specific hash value, or its processed value in a certain data structure with a database, the communication part 120 may acquire (1) the specific user's public key and (2) a hash value of the specific user's information or its processed value when receiving a request for using the authentication information. Herein, the first specific hash value and the first representative hash value correspond to the above-mentioned specific hash value and the above-mentioned representative hash value, respectively.

Herein, if the specific user's public key is transmitted to the bank server 400 and if the specific user is authenticated and the Uhash which is a hash value of the specific user's information is transmitted from the bank server 400 to the biometric authentication server 300, (i) the specific user's public key and (ii) the Uhash or its processed value may be transmitted from the biometric authentication server 300 to the intermediate server 100. Since it was explained by referring to FIG. 5, detailed explanation thereon is omitted.

If a second representative hash value or its processed value corresponds to the first representative hash value or its processed value registered with the database 200, wherein the second representative hash value is created by operating the second specific hash value, i.e., a hash value of the specific user's public key and a hash value of the specific user's information or its processed value, and at least one neighboring hash value determined by referring to the certain data structure, matches the second specific hash value, the processor 110 may transmit the specific user's public key to the biometric authentication server 300 or allow the specific user's public key to be used by the biometric authentication server 300, to thereby (i) allow the biometric authentication server 300 to verify a value, acquired by signing a hash value of the transaction information or its processed value with the private key corresponding to the specific user's biometric information, by using the specific user's public key, and (ii) allow the biometric authentication sever 300 to transmit a message about the verification result.

At the (i), the hash value of the transaction information or its processed value is created by the bank server 400, and the hash value of the transaction information or its processed value may be transmitted to the terminal 500 and signed with the private key corresponding to the specific user's biometric information by the terminal 500 and then transmitted through the bank server 400 to the biometric authentication server 300, by referring to FIG. 5 and its relevant explanation.

If the verification result is a mismatch at the (ii), the processor 110 may allow the message indicating that the transaction is denied to be transmitted. The message may be transmitted to at least one of the terminal 500, the bank server 400, and the biometric authentication server 300. Clearly, it may be transmitted directly to the terminal 500.

The explanation on the first specific hash value aforementioned may be applied to those on the second specific hash value. In other words, the operation of the second specific hash value and at least one neighboring hash value may be performed by various functions. Since it was explained, detailed explanation thereon is omitted.

If (i) the second representative hash value or its processed value does not correspond to the first representative hash value or its processed value registered with the database 200 or (ii) the authentication information is determined to be in a certain state as a result of referring to information on a state of the authentication information with regard to (1) the specific user's public key and (2) a hash value of the specific user's information or its processed value, the communication part 120 may transmit an error message to the biometric authentication server 300. For example, if the authentication information is determined as revoked, the communication part 120 may transmit an error message to the biometric authentication server 300.

Further, if (1) the specific user's public key and (2) a hash value of the specific user's information or its processed value are determined to be allocated to at least two leaf nodes in the Merkle tree, the processor 110 may determine the authentication information as revoked and then transmit or support other device to transmit an error message to the biometric authentication server 300.

If the request for using the authentication information is acquired, the processor 110 may acquire or support other device to acquire an OP message from the database 200 by referring to a certain transaction ID. Further, if the second representative hash value or its processed value corresponds to the first representative hash value or its processed value included in the OP message, the processor 110 may transmit the specific user's public key to the biometric authentication server 300 or allow the biometric authentication server 300 to use the specific user's public key managed by itself, to thereby perform the above-mentioned (i) to (ii).

The second representative hash value may be created by operating the second specific hash value of the specific leaf node and a hash value allocated to at least one other leaf node which corresponds to the specific leaf node of the second specific hash value in the Merkle tree.

In the process of verifying correspondence of the second representative hash value or its processed value with the first representative hash value or its processed value, the processor 110 may create or support other device to create a new Merkle tree. Herein, the Merkle tree created in the process of registration of the authentication information aforementioned may be used. In other words, the processor 110 may (z1) operate or support other device to operate (i) the second specific hash value and (ii) a hash value allocated to a sibling node of the specific node where the second specific hash value is allocated in the Merkle tree created earlier, and may allocate or support other device to allocate a hash value of the operated value to a parent node of the specific node in the new Merkle tree. Further, (z2) if the parent node is the root node of the new Merkle tree, the processor 110 may compare or support other device to compare a hash value allocated to the parent node as the second representative hash value with the value included in the OP message, and (z3) if the parent node is not the root node of the new Merkle tree, the processor 110 may repeat the steps of (z1) to (z2) with the hash value allocated to the parent node as the second specific hash value.

If the root value of the Merkle tree created lastly or its processed value corresponds to the first representative hash value or its processed value included in the OP message, the processor 110 may determine or support other device to determine (1) the specific user's public key and (2) a hash value of the specific user's information or its processed value as verified.

In accordance with the present invention, if a Merkle tree with $n^m$ (=N) leaf nodes is created at the step of the registration of the authentication information, the authentication information may be utilized by fast user verification in which operation whose computational load corresponds to only the height $\log_n N$ (=m) of the Merkle tree is performed at the step of use of the authentication information.

Meanwhile, if the result of the verification is a match and a certain anchoring condition is satisfied, the processor 110 may register or support other device to register with the database 200 a third representative hash value or its processed value, which is created by operating the third specific hash value and at least one neighboring hash value of at least one node corresponding to the node of the third specific hash value, wherein the third specific hash value is a hash value of a value acquired by signing the transaction information or its processed value with the private key. The purpose of this process may be recording the transaction information in the database 200 to prevent denial of the transaction.

In this case, the communication part 120 may acquire a transaction ID representing location information on where the third representative hash value or its processed value is recorded in the database 200 and may transmit the transaction ID to the biometric authentication server 300.

The present invention has an effect of providing a technology that can create authentication information based on a PKI and that can register and manage the information in the blockchain, by combining a blockchain technology with the biometric authentication technology.

The present invention has another effect of creating the authentication information and registering the created authentication information with the database, if there is a request for registration and if a specific user's public key received from the biometric authentication server is determined to be unregistered.

The present invention has still another effect of creating revocation information and registering the created revocation information with the database to thereby revoke the authentication information, if there is a request for revoking the registration and if a specific user's public key received from the biometric authentication server is determined to be registered.

The present invention has still yet another effect of guaranteeing a fast service and reducing a transaction cost while registering and revoking the authentication information.

The present invention has still yet another effect of improving the service speed and reducing the transaction cost by configuring the Merkle tree by using the authentication information and registering only the root value of the Merkle tree with the blockchain instead of registering all of the authentication information with the blockchain.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. They have been provided only to help more general understanding of the present invention. It, however, will be understood by those skilled in the art that various changes and modification may be made from the description without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for creating and registering authentication information, comprising steps of:
   (a) an intermediate server determining whether or not a specific user's public key is registered in a local database of the intermediate server, said determining performed in response to acquiring (i) the specific user's public key and (ii) a first hash value of information of the specific user or a first processed value of the first hash value from a biometric authentication server, wherein the biometric authentication server received a request for registration of authentication information;
   (b) the intermediate server, in response to determining the specific user's public key is unregistered in the local database, and in response to determining that at least one certain anchoring condition is satisfied, generating a representative hash value or a second processed value of the representative hash value, wherein the representative hash value is created by using (1) a specific hash value which is a second hash value of (i) the specific user's public key and (ii) the first hash value or the first processed value and (2) at least one neighboring hash value of at least one neighboring node which corresponds to a node of the specific hash value, wherein the neighboring node includes a node of a neighboring hash value which is another second hash value of (i) another user's public key and (ii) another first hash value of information of the another user or another first processed value of the another first hash value;
   (c) the intermediate server transmitting to a blockchain of virtual currency a transaction for recording on the blockchain in a certain data structure, wherein the transaction includes the representative hash value or the second processed value; and
   (d) the intermediate server, receiving from the blockchain and storing on the local database, a transaction ID representing location information of where the transaction is recorded in the blockchain, for use in future authentication requests wherein the transaction ID is stored along with the specific user's public key;
   wherein, at the step of (a), the request for registration of authentication information is transmitted from a banker server to the biometric authentication server and includes (i) the specific user's public key transmitted from a terminal to the bank server and (ii) a Uhash which is the first hash value of the information of the specific user.

2. The method of claim 1, wherein the specific hash value further includes (iii) a certain amount of a virtual currency.

3. The method of claim 1, wherein the intermediate server stores the specific user's public key and the first hash value of the information of the specific user or the first processed value of the first hash value in the local database.

4. The method of claim 1, wherein the certain anchoring condition includes at least one of (i) a condition that a certain number of (i-1) user's public key and (i-2) a hash value of user's information or processed values of the user's information are acquired, (ii) a condition that a certain amount of time is lapsed, (iii) a condition that a block is created in a blockchain and (iv) a condition that relates to service characteristics.

5. The method of claim 1, wherein, at the step of (b), the intermediate server creates a Merkle tree whose leaf node includes the specific hash value.

6. The method of claim 5, wherein, if the Merkle tree is a first Merkle tree among at least two Merkle trees connected in a form of a chain, a hash value of a certain message data comprised of text, number or symbol or a processed value of the hash value is allocated to a first leaf node of the Merkle tree.

7. The method of claim 5, further comprising steps of:
   (x1) the intermediate server using (i) the specific hash value and (ii) a hash value allocated to a sibling node of a specific node where the specific hash value is allocated, to thereby acquire a resultant value, and then allocating a hash value of the resultant value to a parent node of the specific node,
   (x2) the intermediate server registering, when the parent node is a root node of the Merkle tree, the hash value of the resultant value allocated to the parent node as the representative hash value with the database, and
   (x3) the intermediate server performing steps (x1) to (x2) repeatedly, when the parent node is not the root node of the Merkle tree, by treating the hash value of the resultant value allocated to the parent node as the specific hash value.

8. The method of claim 7, wherein, at the step of (x1), the intermediate server, when a hash value is not allocated to the sibling node of the specific node even though the certain anchoring condition is satisfied, allocates a certain hash value to the sibling node to thereby perform the steps (x1) to (x3).

9. The method of claim 1, further comprising the intermediate server storing the specific hash value and the at least one neighboring hash value in a first data structure and then storing and managing a second data structure identical in a form to the first data structure, thereby connecting the first data structure and the second data structure in a form of a chain.

10. The method of claim 9, wherein, when the first data structure and the second data structure are Merkle trees, a root value of the first data structure or a hash value of the root value is allocated to a first leaf node of the second data structure.

11. The method of claim 1, wherein, at the step of (b), if the specific user's public key is determined to be registered, the intermediate server transmits an error message.

12. A server for creating and registering authentication information, comprising:
 a tangible communication part configured for acquiring (i) a specific user's public key, and (ii) a first hash value of information of the specific user or a first processed value of the first hash value from a biometric authentication server, wherein the biometric authentication server received a request for registration of authentication information; and
 a processor programmed for, in response to determining the specific user's public key is unregistered in a local database, and in response to determining that at least one certain anchoring condition is satisfied, generating a representative hash value or a second processed value of the representative hash value, wherein the representative hash value is created by using (1) a specific hash value which is a second hash value of (i) the specific user's public key and (ii) the first hash value or the first processed value and (2) at least one neighboring hash value of at least one neighboring node which corresponds to a node of the specific hash value, wherein the neighboring node includes a node of a neighboring hash value which is another second hash value of (i) another user's public key and (ii) another first hash value of information of the another user or another first processed value of the another first hash value, transmitting to a blockchain of virtual currency a transaction for recording on the blockchain in a certain data structure, and receiving from the blockchain and storing on the local database, a transaction ID representing location information of where the transaction is recorded in the blockchain, for use in future authentication requests wherein the transaction ID is stored along with the specific user's public key;
 wherein the request for registration of authentication information is transmitted from a banker server to the biometric authentication server and includes (i) the specific user's public key and (ii) a Uhash which is the first hash value of the information of the specific user.

13. The server of claim 12, wherein the specific hash value further includes (iii) a certain amount of a virtual currency.

14. The server of claim 12, wherein the processor stores the specific user's public key and the first hash value of the information of the specific user or the first processed value of the first hash value in the local database.

15. The server of claim 12, wherein the certain anchoring condition includes at least one of (i) a condition that a certain number of (i-1) user's public key and (i-2) a hash value of user's information or processed values of the user's information are acquired, (ii) a condition that a certain amount of time is lapsed, (iii) a condition that a block is created in a blockchain and (iv) a condition that relates to service characteristics.

16. The server of claim 12, wherein, the processor creates a Merkle tree whose leaf node includes the specific hash value.

17. The server of claim 16, wherein, if the Merkle tree is a first Merkle tree among at least two Merkle trees connected in a form of a chain, a hash value of a certain message data comprised of text, number, symbol or a processed value of the hash value is allocated to a first leaf node of the Merkle tree.

18. server of claim 16, wherein the processor is further programmed for performing steps of:
 (x1) using (i) the specific hash value and (ii) a hash value allocated to a sibling node of a specific node where the specific hash value is allocated, to thereby acquire a resultant value, and then allocating a hash value of the resultant value to a parent node of the specific node,
 (x2) registering, when the parent node is a root node of the Merkle tree, the hash value of the resultant value allocated to the parent node as the representative hash value with the database, and
 (x3) performing steps (x1) to (x2) repeatedly, when the parent node is not the root node of the Merkle tree, by treating the hash value of the resultant value allocated to the parent node as the specific hash value.

19. The server of claim 18, wherein, at the step of (x1), the processor, when a hash value is not allocated to the sibling node of the specific node even though the certain anchoring condition is satisfied, allocates a certain hash value to the sibling node to thereby perform the steps (x1) to (x3).

20. The server of claim 12, wherein the processor is further programmed for storing the specific hash value and the at least one neighboring hash value in a first data structure and then storing and managing a second data structure identical in a form to the first data structure, thereby connecting the first data structure and the second data structure in a form of a chain.

21. The server of claim 20, wherein, when the first data structure and the second data structure are Merkle trees, a root value of the first data structure or a hash value of the root value is allocated to a first leaf node of the second data structure.

22. The server of claim 12, wherein, if the specific user's public key is determined to be registered, the tangible communication part transmits an error message.

* * * * *